Figure 1:
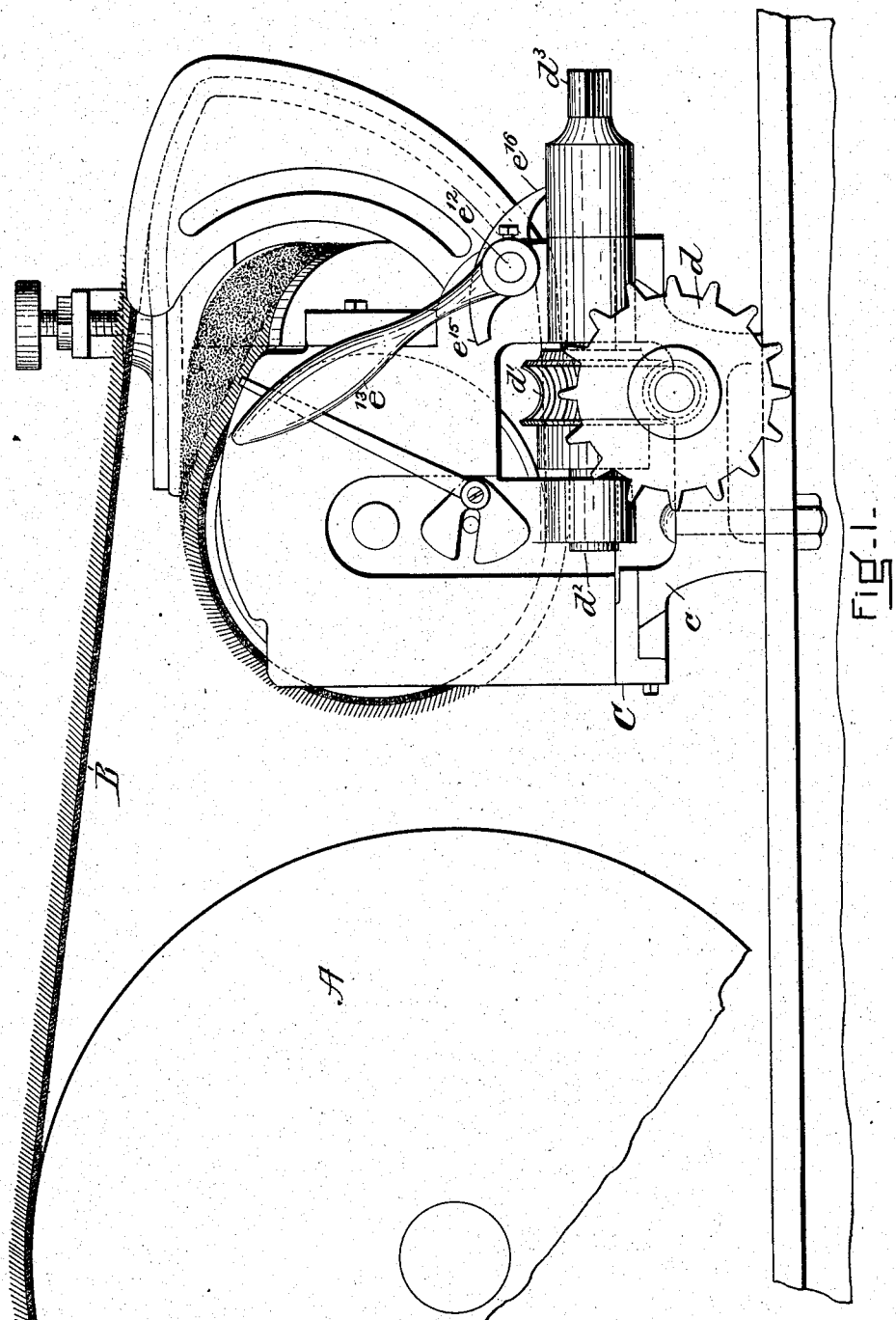

No. 760,696. PATENTED MAY 24, 1904.
C. MILLS.
MACHINE FOR APPLYING CARD CLOTHING TO CYLINDERS.
APPLICATION FILED MAR. 12, 1903.
NO MODEL. 4 SHEETS—SHEET 1.

WITNESSES:
INVENTOR:
Charles Mills

No. 760,696. PATENTED MAY 24, 1904.
C. MILLS.
MACHINE FOR APPLYING CARD CLOTHING TO CYLINDERS.
APPLICATION FILED MAR. 12, 1903.
NO MODEL. 4 SHEETS—SHEET 4.

WITNESSES:
M. E. Flaherty
M. V. Foley

INVENTOR:
Charles Mills
by F. F. Raymond 2d
his attorney

No. 760,696. Patented May 24, 1904.

UNITED STATES PATENT OFFICE.

CHARLES MILLS, OF NEWTON, MASSACHUSETTS, ASSIGNOR TO SACO & PETTEE MACHINE SHOPS OF NEWTON, MASSACHUSETTS, A CORPORATION OF MASSACHUSETTS.

MACHINE FOR APPLYING CARD-CLOTHING TO CYLINDERS.

SPECIFICATION forming part of Letters Patent No. 760,696, dated May 24, 1904.

Application filed March 12, 1903. Serial No. 147,436. (No model.)

*To all whom it may concern:*

Be it known that I, CHARLES MILLS, a citizen of the United States, and a resident of Newton, in the county of Middlesex and State of Massachusetts, have invented a new and useful Improvement in Machines for Applying Card-Clothing to Cylinders, of which the following is a full, clear, and exact description, reference being had to the accompanying drawings, forming a part of this specification.

Machines for applying card-clothing to cylinders as heretofore constructed embody means for mounting and turning the cylinder to which the clothing is being applied, a traveling carriage movable lengthwise the cylinder and having means for guiding the fillet or length of card-clothing which is being applied to the cylinder, means for exerting a tension upon it and for varying said tension, and further means for automatically ascertaining the degree of said tension. The carriage-driving mechanism is adjustably connected with that turning the cylinder, so that the travel of the carriage may be varied to correspond in the necessary way with the surface speed of the cylinder.

The present invention has to do only with the means for feeding or actuating the carriage. Heretofore this has consisted of a long screw of about the length of the cylinder to be covered and provided with rotation from the cylinder-turning devices and a worm-wheel mounted upon the carriage in a manner to engage the thread of the screw and adapted to be clamped stationary to the carriage to permit the carriage to be fed by the screw and to be released or unclamped to enable the carriage after a feeding movement to be returned to its initial position. This feeding mechanism was located at the forward end of the carriage, and it has been found in practice to be undesirable, because the engagement between the worm-wheel and the screw is limited to two or three teeth of the wheel and because of the location of the worm-wheel upon the carriage and because of the large strains to which the screw and worm-wheel are subjected, the practical effect being to soon destroy the worm-wheel and to injure the screw and to cause the carriage to travel hard and irregularly. I do not, however, dispense entirely with the use of the worm-wheel, but employ it as a means for returning the carriage after a feeding movement to its original position, as will be hereinafter explained. This use does not subject the worm or the feeding-screw to strains and does not affect the operation of feeding the card-clothing, so that the use of the worm-wheel for this purpose is not objectionable.

For feeding the carriage there is employed a long nut, which is attached to the carriage near the center of its length and in such a manner that it may be readily engaged with the driving-screw and also disengaged from it and also so that when engaged with the driving-screw and worked it shall bear against the frame of the carriage and thus relieve its holding and supporting mechanism from strain. By a carriage-feeding mechanism of this organization the connection between the carriage and the driving-screw is obtained at a desirable point with respect to the length of the carriage and the strains to which it is subjected, and it is of such a character that the work is distributed upon a considerable length of the driving-screw, and the wear upon the nut instead of being confined to two or three threads is extended to a large number of threads and which are shaped to the curvature of the screw and are not reversely shaped with respect to the screw as are the threads of the worm-wheel.

I will now describe the invention in detail in conjunction with the drawings forming a part of this specification, wherein—

Figure 2:
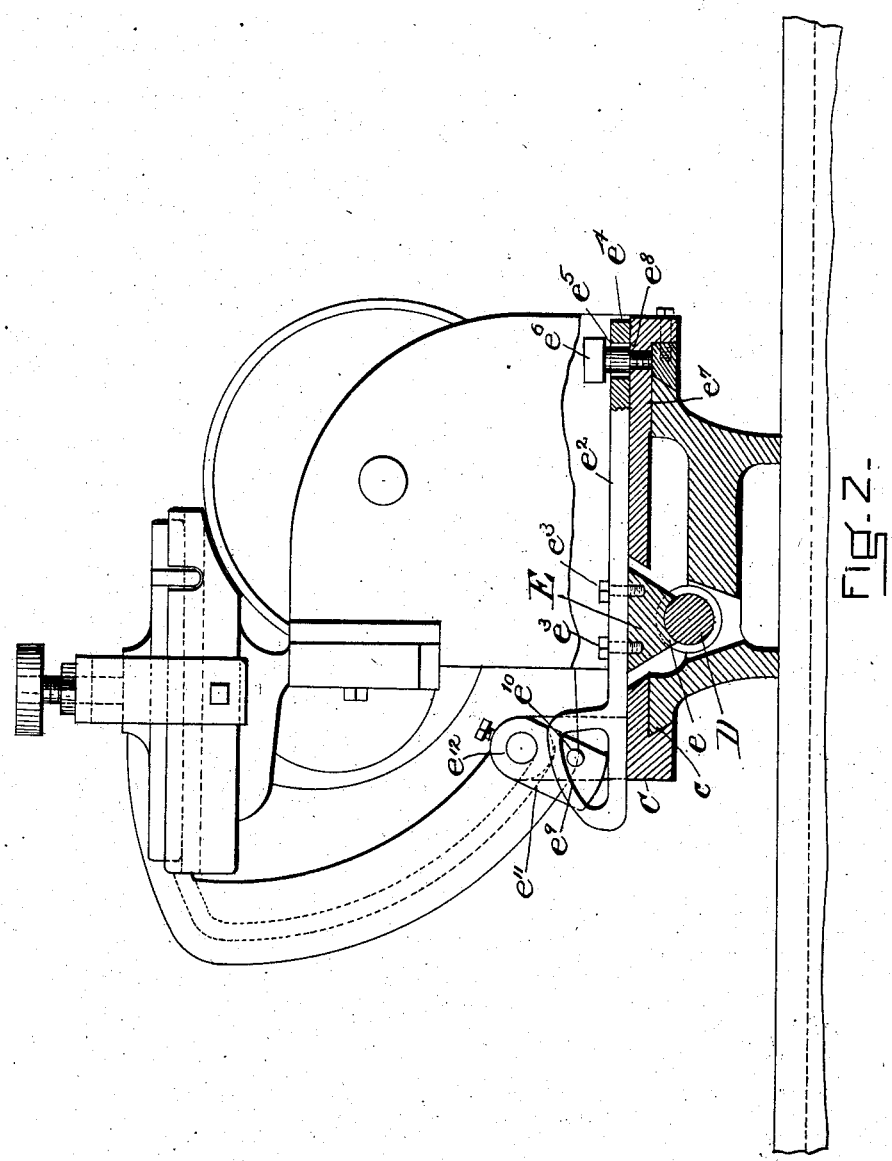
Figure 3:
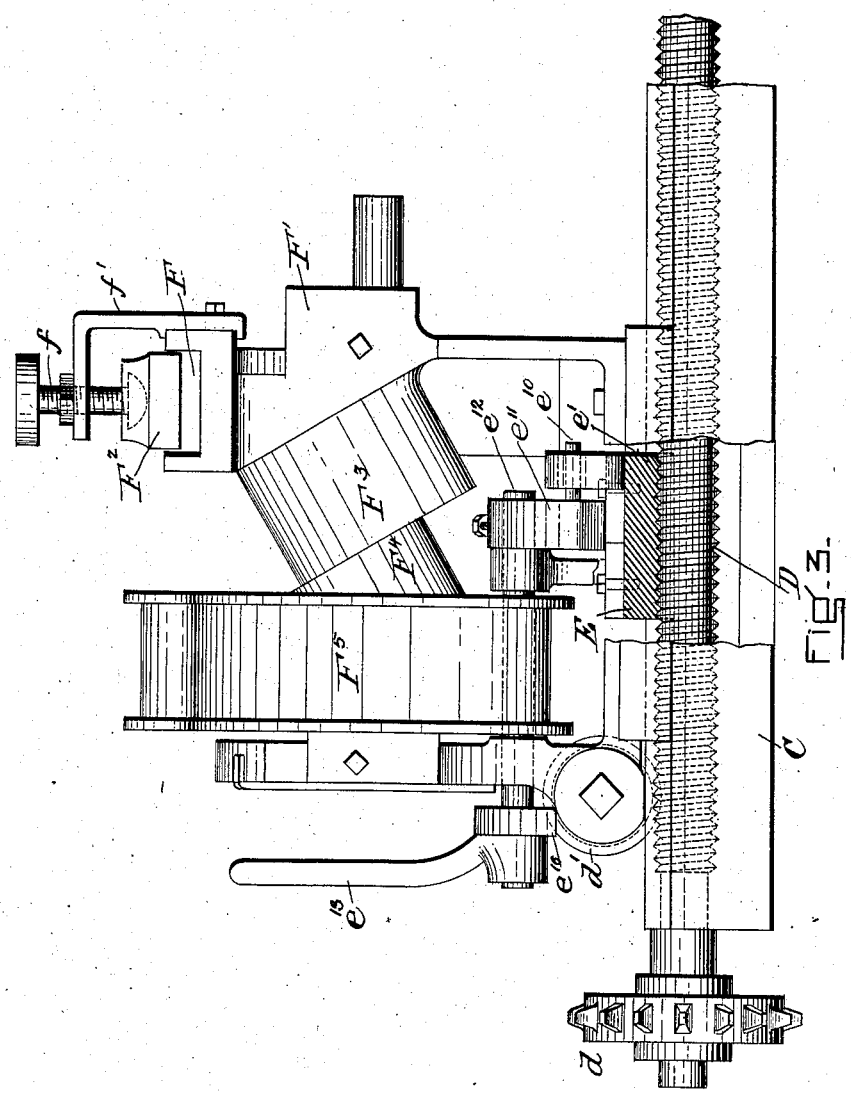
Figure 4:
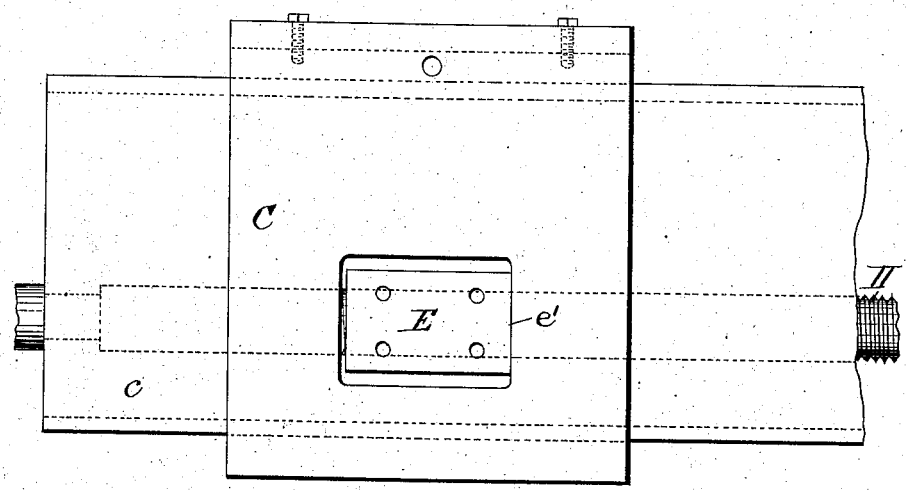

Figure 1 is a view in end elevation of the carriage, also showing a portion of a cylinder to which card-clothing is being applied. Fig. 2 is a view in vertical section through the carriage, its stand, the driving-screw, and the nut, and in elevation of parts back of the same. Fig. 3 is a view principally in front elevation of the carriage and carriage-stand. Fig. 4 is a plan view of the carriage-stand, carriage, driving-screw, and feeding-nut, all the parts above the carriage-floor being omitted.

Referring to the drawings, A represents a cylinder of a carding-engine mounted in the machine, to be turned by mechanism not shown.

B represents a fillet or length of card-clothing running from the carriage.

C is the carriage. It is mounted in the usual way to slide upon the carriage-stand $c$, which extends crosswise the machine and so that the carriage may be slowly moved lengthwise the cylinder while the card-clothing is being wound upon it, the feeding movement of the carriage being about equal to the width of the fillet or length of card-clothing for every full revolution of the cylinder A.

The card-clothing guiding and tension devices shown in the drawings will be recognized as well known in the art. They consist mainly of a recessed passage F in the upright F', above which passage the plate $F^2$ is supported by means of the adjusting-screw $f$, carried by the bracket $f'$. From this passage the incoming clothing-strip passes over intermediate drums, as indicated at $F^3$ and $F^4$, and around the lever $F^5$ to the cylinder A.

D is a long driving-screw mounted in the carriage-stand and turned by a sprocket-wheel $d$ at one end and a sprocket-chain (not shown) which connects it with the driving-gear of the cylinder-turning mechanism.

$d'$ is a worm-wheel mounted upon a shaft $d^2$ and applied to the carriage. The worm-wheel is free to turn with the carriage while it is being fed by the driving-screw. It is used only to move the carriage either to its initial position or such other positions as may be preferred when it is desirable to move it quickly; but it performs no function in feeding the carriage. When employed for returning or otherwise moving the carriage, a turning-handle (not shown) is applied to the square end $d^3$ of its shaft and which is used in turning the shaft, and consequently the worm-wheel, at any speed desired.

E is the feeding-nut of the carriage. It is made long and its threads $e$ are curved to the curve of the threads of the driving-screw, but are made slightly thinner, so that the nut may have a very slight longitudinal movement when subjected to strain, whereby its end $d'$ may come into contact with the portion of the frame of the carriage in line with the screw, and in order also that the part by which the nut is adjusted and its attaching devices may be relieved from strain. This construction will be understood from Figs. 2 and 4. It will be seen from Fig. 4 that the carriage C has a rectangular opening in its base or floor and that the nut E is slightly shorter than the length of this opening, so that it will have a slight longitudinal play therein. The nut preferably is a quarter segment or part of a usual nut, and it is formed by cutting such a full nut of the desired length into four or five equal parts. The nut is provided with engaging and disengaging movements by means of a lever $e^2$. This lever is in the form of a plate. The nut is attached to its under surface by means of the screws $e^3$ passing through it. Its end $e^4$ has holes $e^5$, through which headed studs $e^6$ extend. These headed studs screw into the carriage-base $e^7$. A shoulder $e^8$ limits the extent to which they may be screwed and provides between the head $e^6$ and the plate $e^2$ sufficient space for the vertical movement of the nut-lever $e^2$ up and down, the portions of the studs within the holes being enough smaller to permit this movement of the lever. The other end of the lever is provided with a cam $e^9$, with which a lifting-pin $e^{10}$, projecting horizontally from the rocking arm $e^{11}$, engages. The rocking arm is at the end of a rock-shaft $e^{12}$, which is supported by the carriage and extends to one end thereof, where it has the handle $e^{13}$ by which it is turned. The upward movement of the pin riding upon the cam lifts the lever $e^2$ and the nut E from engagement with the driving-screw, and the handle $e^{13}$ is of such weight and is then so located as to act as an overbalance for the lever and nut and to thus hold them in their elevated position. The rocking arm $e^{11}$ serves also upon the turning of the shaft $e^{12}$ to move the lever $e^2$ and nut E downward and the nut into engagement with the driving-screw, and it further serves to lock the lever and nut into such engagement. This movement and locking effect is obtained by the outer end $e^{14}$ of the rocking arm which comes into contact with a portion of the upper surface of the lever $e^2$ beyond the cam and rides thereon until it reaches a vertical locking position therewith, (see Fig. 3,) when the nut will be held in positive engagement with the driving-screw. The rock-shaft has the two stops $e^{15}$ and $e^{16}$, which preferably are cast integral with the handle $e^{13}$ and which serve to limit the extent of movement of the lifting-pin $e^{10}$ and the rocking arm $e^{11}$ by contact with convenient parts of the carriage.

The operation of the invention is as follows: With the carriage in its initial or starting position and attached to the driving-screw to be fed thereby, the threads of the carriage-nut are in engagement with the threads of a long section of the screw, and the nut is held locked in such engaging position. Upon the starting of the feeding movement of the carriage the nut is immediately caused to come into contact with a portion of the carriage beyond it and is held in such position by the strain of the card-clothing or fillet upon the carriage, which often amounts to two or three hundred pounds. The carriage by the slow rotation of the driving-screw is then slowly fed while the card-strip or fillet is being applied to the cylinder. When the carriage reaches the end of the feeding movement, it is unlocked and lifted from its engaging relation with the driving-screw and to a position entirely free or detached from it, where it is automatically held by the action of the lifting mechanism. The carriage is then free to be returned to its initial or any other position at any speed required and one not dependent upon the speed of the driving-screw by turning the worm-wheel $d'$, which is in constant engaging relation with the thread of the driving-screw, but which does not serve to communicate any power from the driving-screw to the carriage.

Having thus fully described my invention, I claim and desire to secure by Letters Patent of the United States—

1. In a machine of the character specified, in combination a card-clothing-applying carriage suitably supported, means for feeding it, and a sectional nut of considerable length attached to said applying-carriage to engage with and be disengaged from the feeding-screw.

2. In a machine of the character specified, a card-clothing-applying carriage, means for feeding it in one direction comprising a screw and a sectional nut of considerable length attached to the applying-carriage to be engaged with and disengaged from the feeding-screw, and further means for moving the carriage in a reverse direction comprising the feeding-screw when stationary, a worm-wheel upon the carriage to engage the screw and means for turning the worm-wheel, as described.

3. In a machine of the character specified, a card-clothing-applying carriage, a carriage-feeding screw, a feeding connection between the screw and carriage actuated by the screw, and a return connection between the carriage and screw engaging with the screw to move the carriage thereby.

4. In a machine of the character specified, a card-clothing-applying carriage, a carriage-feeding screw, a sectional nut of considerable length to engage the screw, means for mounting the nut in the carriage comprising a lever loosely attached to the carriage to which the nut is secured, means for locking the lever with the nut in engagement with the screw, and an abutment on the carriage in line with the screw with which the nut comes in contact.

5. In a machine of the character specified, a card-clothing-applying carriage, a carriage-feeding screw, a sectional nut to engage the screw, and means for connecting the nut with the carriage, and for engaging it with and disengaging it from the screw.

6. In a machine of the character specified, a card-clothing-applying carriage, a carriage-feeding screw, a sectional nut on the carriage movable toward and from the screw, and also to a limited degree lengthwise the carriage, and means for holding the nut in engagement with the screw and for holding it removed from the screw.

7. In a machine of the character specified, a card-clothing-applying carriage, a feeding-screw, a sectional nut of considerable length carried by the carriage, means connecting the nut with the carriage comprising a plate to the under surface of which the nut is secured, having at one end enlarged holes and at the other end a lifting-cam and locking-surface, bolts having a loose connection with the plate passing through said holes and forming an attaching-fulcrum for the plate, a rock-shaft, a handle for turning it, and a locking-arm carried by the shaft, having a surface to engage the plate and lock it, and a pin to engage its lifting-cam.

8. In a machine of the character specified, a card-clothing-applying carriage, a carriage-feeding screw, a sectional feeding-nut attached to the carriage, and movable with relation thereto, means for releasing the nut whereby it may engage the screw, means for locking it in engaging position, as described.

9. In a machine of the character specified, a card-clothing-applying carriage having two mechanisms for moving it, the one a screw and being positively connected with said carriage whereby the rotation of the screw will accomplish a slow movement of the carriage, the other mechanism comprising a worm-gear adapted to engage said carriage, as a rack, as and for the purposes described.

10. As a means for connecting and disconnecting a card-clothing-applying carriage with a feeding-screw, a sectional nut of considerable length to engage at the same time a relatively large number of the threads of the screw attached to the applying-carriage and movable thereon into and out of engagement with the feeding-screw, in combination with means adapted to be operated when said sectional nut is out of said engagement to cause the rapid movement of said carriage along said feeding-screw, as described.

CHARLES MILLS.

In presence of—
  EDMUND E. BLAKE,
  EDWIN H. ALEXANDER.